United States Patent
Yuca et al.

(10) Patent No.: US 11,652,205 B2
(45) Date of Patent: May 16, 2023

(54) MODIFICATION OF SILICON WITH ACRYLIC OR METHACRYLIC DERIVATIVES USED AS AN ANODE ACTIVE MATERIAL IN THE LITHIUM ION BATTERY TECHNOLOGY

(71) Applicant: ENWAIR ENERJI TEKNOLOJILERI A.S., Istanbul (TR)

(72) Inventors: Neslihan Yuca, Istanbul (TR); Omer Suat Taskin, Istanbul (TR); Murat Ferhat Dogdu, Istanbul (TR)

(73) Assignee: ENWAIR ENERJI TEKNOLOJILERI A.S., Istanbul (TR)

(*) Notice: Subject to any disclaimer, the term of this patent is extended or adjusted under 35 U.S.C. 154(b) by 1010 days.

(21) Appl. No.: 16/468,009

(22) PCT Filed: Apr. 18, 2018

(86) PCT No.: PCT/TR2018/050173
§ 371 (c)(1),
(2) Date: Jun. 10, 2019

(87) PCT Pub. No.: WO2019/203739
PCT Pub. Date: Oct. 24, 2019

(65) Prior Publication Data
US 2020/0144613 A1 May 7, 2020

(51) Int. Cl.
| | | |
|---|---|---|
| C08F 2/26 | (2006.01) | |
| C08F 2/30 | (2006.01) | |
| C09K 23/00 | (2022.01) | |
| H01M 4/38 | (2006.01) | |
| C08F 292/00 | (2006.01) | |
| H01M 10/0525 | (2010.01) | |
| H01M 4/62 | (2006.01) | |
| H01M 4/1395 | (2010.01) | |
| H01M 4/36 | (2006.01) | |
| C08L 51/10 | (2006.01) | |
| H01M 4/02 | (2006.01) | |

(52) U.S. Cl.
CPC ........... *H01M 4/386* (2013.01); *C08F 292/00* (2013.01); *C08L 51/10* (2013.01); *H01M 4/1395* (2013.01); *H01M 4/366* (2013.01); *H01M 4/62* (2013.01); *H01M 10/0525* (2013.01); *H01M 2004/027* (2013.01)

(58) Field of Classification Search
CPC ... C08F 2/26; C08F 2/30; C09K 23/00; C09K 23/018
USPC .......................................................... 524/745
See application file for complete search history.

(56) References Cited

U.S. PATENT DOCUMENTS

| 2014/0099542 A1* | 4/2014 | Niwa ..................... H01M 4/13 429/211 |
| 2016/0164081 A1* | 6/2016 | Cui ....................... H01M 4/625 427/58 |
| 2017/0062827 A1 | 3/2017 | Bruckmeier et al. |

FOREIGN PATENT DOCUMENTS

EP        2415108 B1    7/2017

OTHER PUBLICATIONS

Aoki, Shoko et al. Acrylic Acid-Based Copolymers as Functional Binder for Silicon/Graphite Composite Electrode in Lithium-Ion Batteries. Journal of the Electrochemical Society. Aug. 28, 2015. 162. A2245-A2249. 10.1149/2.0171512jes.
Wei Liangming, et al. Poly (Acrylic Acid Sodium) Grafted Carboxymethyl Cellulose as a High Performance Polymer Binder for Silicon Anode in Lithium Ion Batteries, Scientific Reports , Jan. 20, 2016. Http://doi.org/10.1038/srep19583.
Delong Ma, et al. Si-Based Anode Materials for Li-Ion Batteries: A Mini Review. Nano-Micro Lett. Sep. 27, 2014, 6(4): 347-358.

* cited by examiner

*Primary Examiner* — Kelechi C Egwim
(74) *Attorney, Agent, or Firm* — Bayramoglu Law Offices LLC

(57) ABSTRACT

A method of the modification of the silicon surface that is used as an anode active material in lithium ion batteries, with all of the monomers and derivatives thereof (acrylate group, methacrylate group, styrene, vinyl acetate, acrylic acid and salts thereof) that contain an acrylic or methacrylic group.

2 Claims, 1 Drawing Sheet

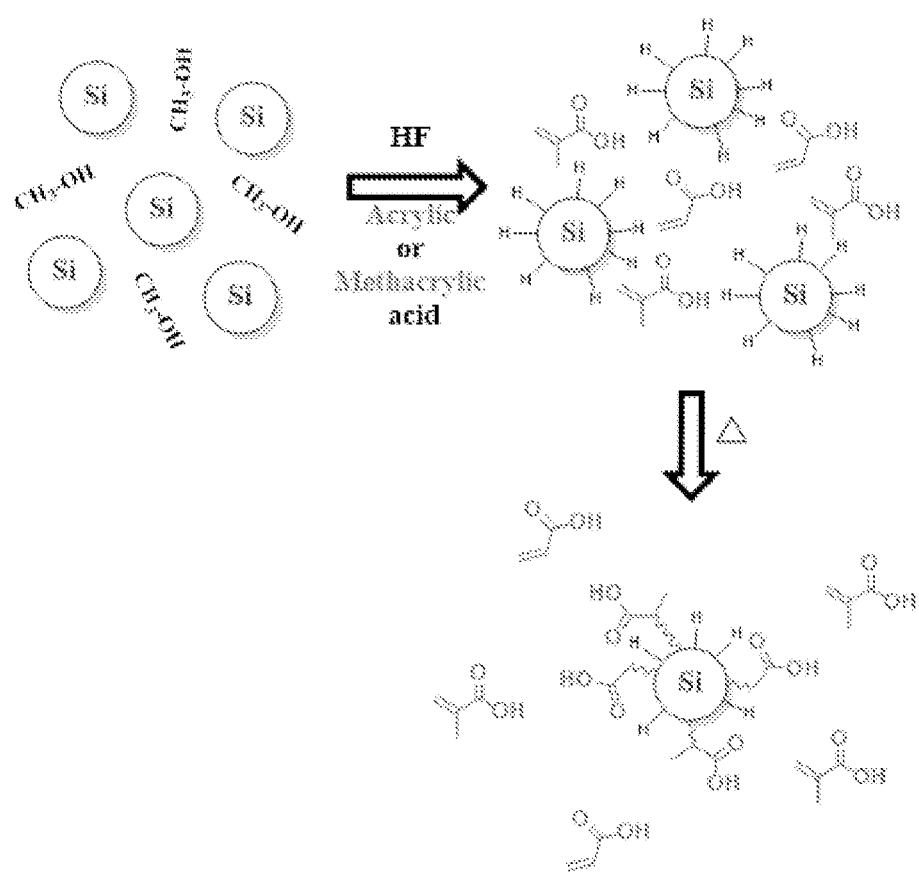

MODIFICATION OF SILICON WITH ACRYLIC OR METHACRYLIC DERIVATIVES USED AS AN ANODE ACTIVE MATERIAL IN THE LITHIUM ION BATTERY TECHNOLOGY

CROSS REFERENCE TO THE RELATED APPLICATIONS

This application is the national phase entry of International Application No. PCT/TR2018/050173, filed on Apr. 18, 2018, the entire contents of which are incorporated herein by reference.

TECHNICAL FIELD

The present invention relates to the method of the modification of the silicon surface that is used as an anode active material in lithium ion batteries, with all of the monomers and derivatives thereof (acrylate group, methacrylate group, styrene, vinyl acetate, acrylic acid and salts thereof) that contain an acrylic or methacrylic group.

BACKGROUND

Lithium ion batteries are commonly preferred as a source of power in particular, for consumer electronics (mobile phones, laptop computers, digital cameras and cameras, etc.) and the other wireless and portable electronic devices. Furthermore, lithium ion batteries are used in military applications and the operation of the emergency systems of planes in the field of aviation. On the other hand, significant developments that have been recently recorded in the lithium ion battery technology have allowed these batteries to be used in electrical gadgets, stationary energy storing systems for storing renewable energy types such as solar and wind power energy and also in intelligent networks.

Lithium ion batteries which are a member of the group of rechargeable (secondary) batteries are capable of supplying high energy relative to their volume and weight. Lithium which is the lightest metal and has the highest oxidation potential can contribute to these batteries and also can enable them to be used as batteries with the highest gravimetric and volumetric energy density. Lithium ions switch between the anode (negative electrode) and the cathode (positive electrode) and move from the anode to the cathode during discharging while moving from the cathode to the anode during charging.

In traditional silicon batteries, the electrode is prepared by adding polymers separately (without chemical silicon modification) to the mixture of anode active material and it would be apparent in the results obtained that the silicon is disintegrated as a result of a determined cycle.

Unlike traditional graphite anode, use of Si as a negative electrode material is subjected to significant volume changes (>400%) during the lithiation process which extremely threatens the cycle stability of lithium ion batteries (LIB). Mechanical stress caused by this repetitive volume change, breaks the anode composite and separates the components of the LIBs from each other; this results in a weak electrical contact between the Si particles and also a significant damage in the electrode during the cycle. Even worse, this negative effect would become more apparent when the electrode is generated for the practical high energy cells in which the active agents on current accumulator, need charging in great amounts.

Silicon has been well known for years to have the highest capacity among lithium ion materials and it has a theoretical capacity of 4200 mAh $g^{-1}$. This means that it has ten times higher capacity relative to those of the graphite-based anodes currently used. However, the application has the drawback that, it has a volumetric expansion three times higher, during the lithiation process from the phase Si to the phase $Li_{15}Si_4$. Such great volumetric change results in great capacity loss by breaking integration of the electrode. Various methods from the nanostructures to the flexible binders are attempted to solve the aforementioned drawback.

In the article titled "Si-Based Anode Materials for Li-Ion Batteries: A Mini Review", the silicon is disclosed as the most interesting anode material for lithium ion batteries. The recent developments of the Si anode material are disclosed in said article. Disperse solvent of the silicon is prepared in methyl alcohol and treated with concentrated hydrofluoric acid for a determined period of time and then subjected to an etching process. After the Si—H groups are obtained, they are left to polymerization with acrylic acid/methacrylic acid and derivatives thereof at a determined temperature. Optimum polymer chain lengths are obtained relative to the reaction period, which supports silicon disintegration both in terms of volume and with the help of flexibility provided by the polymer and also enables them to have longer cycle life.

In the prior art European patent numbered EP2415108B1, an anode which contains silicon material for the rechargeable lithium ion batteries is disclosed. It is disclosed that this structure contains at least one polymer such as Acrylic acid, 3-Butenoic acid (vinyl acetic acid), 2-Methacrylic acid, 2-Pentenoic acid, 2,3 Dimethylacrylic acid (tiglic acid), 3,3 Dimethacrylic acid, Trans-butenedioic acid (fumaric acid), Cis-butenedioic acid (maleic acid), Itaconic acid, and co-polymers.

In another prior art United States patent numbered US2017062827A1, the binding systems that contain a polymer mixture developed for the lithium ion batteries are disclosed. It is also disclosed that the electrodes within the anodes of the lithium ion batteries of said invention contain a polymer mixture. Said polymer mixture is described to include groups such as acrylic acid, methacrylic acid and the like.

However, the acrylic polymer is not chemically bound to the silicon as a result of a reaction in the above-mentioned studies and the polymers of the acrylic group are used as a binder in the Si-based anode studies. In other words, the mixture is prepared by physically adding polymers such as PAA, PMA and PVDF to the silicon mixture and thereby used as an adhesive/binder. Accordingly, the aforementioned problems and the drawback of volumetric expansion in the batteries that are prepared by physically adding binding polymers (PAA, PMA) to the mixture are still present.

Due to all of these disadvantages, the method of the modification of silicon used as an anode active material in the lithium ion battery technology with acrylic or methacrylic derivatives according to the present invention has been a matter of necessity.

SUMMARY

An aim of the invention is to provide the method of the modification of silicon used as an anode active material in the lithium ion batteries with acrylic or methacrylic derivatives, which is also developed for preventing disintegration of the silicon as a result of its volumetric expansion during the lithiation/delithiation process.

Another aim of the present invention is to provide the method of chemical binding of the acrylic polymer to the silicon.

A further aim of the invention is to provide the method of the modification of silicon used as an anode active material in the lithium ion batteries with acrylic or methacrylic derivatives, which is also developed for maintaining the structure of the battery when it expands and contracts during charging and discharging.

The present invention relates to the method of the modification of silicon with acrylic or methacrylic derivatives and the method consists of the following steps;
- preparing the disperse solvent of silicon in methyl alcohol,
- transforming the solvent obtained into Si—H form after being etched by treating with concentrated hydrofluoric acid for 1-120 minutes,
- leaving the Si—H groups obtained, to be polymerized with acrylic acid or methacrylic acid derivatives or acrylate groups or methacrylate groups or styrenes or vinyl acetates or acrylic acid and salts thereof at 25-150° C.

Acrylic or methacrylic polymers can be chemically bound to silicon as a result of a reaction by successively performing these steps of the method.

BRIEF DESCRIPTION OF THE DRAWINGS

FIGURE shows the modification of the silicon surface with acrylic acid and derivatives thereof.

DETAILED DESCRIPTION OF THE EMBODIMENTS

With the invention, it is aimed to avoid the disintegrations formed as a result of the volumetric expansion by subjecting the silicon surface to a chemical process. Referring to the FIGURE, an etching process is carried out by treating the silicon used in the lithium batteries with hydrofluoric acid before use. Then, a surface polymerization process is performed with acid or methacrylic acid (acrylate group, methacrylate group, styrene, vinyl acetate, acrylic acid and salts thereof) monomers through the Si—H groups formed on the surface (FIGURE). Disintegrations likely to be formed as a result of the volumetric expansion of the silicon during the lithiation/delithiation processes are thereby avoided.

The polymers that we have synthesized in addition to the modified silicon prepared according to the invention are in a state in which they can compensate the aforementioned volumetric expansion. The active material thus can maintain its structure when the battery expands and contracts during its charging and discharging processes. It allows the electrode to be durable for longer cycles. Furthermore, as the structure is prevented from being pulverized, the capacity of the electrode is substantially used. In this case, battery life would be extended and the capacity of the same would be increased.

The advantages to be obtained due to the method developed are listed below.

Treatment of the silicon end groups with acrylic or methacrylic acid derivatives that give flexibility, forms the spaces that can tolerate silicon growth due to the volumetric expansion of the same. This also prevents an easier placement and disintegration for the atomic diameter of the silicon which has grown.

Metallic form of the silicon is enabled to be transformed into the Si—H form after being etched by treating with hydrofluoric acid before as the direct reaction with the acrylic monomers is not possible for the same. Finally, possibility of an easier reaction with monomers is provided.

What is claimed is:

1. A method of the modification of silicon with acrylic or methacrylic derivatives, comprising the steps of:
   - preparing a disperse solvent of silicon in methyl alcohol,
   - transforming the disperse solvent into an Si—H form after being etched by treating with concentrated hydrofluoric acid to obtain Si—H groups,
   - leaving the Si-H groups to polymerize with one selected from the group consisting of acrylic acid, methacrylic acid, acrylate group, methacrylate group, styrene, vinyl acetate, acrylic acid and salts thereof.

2. The method according to claim 1, wherein, the Si—H groups are left to polymerize with one selected from the group consisting of acrylic acid, methacrylic acid, acrylate group, methacrylate group, styrene, vinyl acetate, acrylic acid and salts thereof at 25-150° C.

\* \* \* \* \*